(12) United States Patent
Freeman et al.

(10) Patent No.: US 10,158,596 B2
(45) Date of Patent: Dec. 18, 2018

(54) CORRECTION OF ONLINE IDENTIFIERS

(71) Applicant: Microsoft Technology Licensing, LLC, Redmond, WA (US)

(72) Inventors: David Stephen Mandell Freeman, Mountain View, CA (US); Qin Sun, Sunnyvale, CA (US); Thomas Chow, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 14/793,544

(22) Filed: Jul. 7, 2015

(65) Prior Publication Data

US 2017/0012924 A1    Jan. 12, 2017

(51) Int. Cl.
*H04L 12/58*    (2006.01)
*G06F 17/30*    (2006.01)

(52) U.S. Cl.
CPC ........ *H04L 51/28* (2013.01); *G06F 17/30876* (2013.01); *G06F 17/30887* (2013.01); *H04L 51/30* (2013.01)

(58) Field of Classification Search
None
See application file for complete search history.

(56) References Cited

U.S. PATENT DOCUMENTS

| | | | | |
|---|---|---|---|---|
| 6,047,300 A | * | 4/2000 | Walfish | G06F 17/273 715/257 |
| 6,646,573 B1 | * | 11/2003 | Kushler | G06F 3/018 341/22 |
| 7,886,346 B2 | | 2/2011 | Sandhu et al. | |
| 2004/0193925 A1 | * | 9/2004 | Safriel | H04L 63/083 726/6 |
| 2009/0043855 A1 | * | 2/2009 | Bookstaff | H04L 51/30 709/206 |
| 2010/0274970 A1 | * | 10/2010 | Treuhaft | H04L 29/12066 711/118 |
| 2015/0106725 A1 | * | 4/2015 | Kamdar | H04L 61/3025 715/739 |

(Continued)

*Primary Examiner* — Krista M Zele
*Assistant Examiner* — Mohammad Yousuf A. Mian
(74) *Attorney, Agent, or Firm* — Hickman Palermo Becker Bingham LLP

(57) ABSTRACT

Techniques are provided for proposing automatic corrections of online identifiers, such as an email address or a subject name of a directory entry or a certificate. In an embodiment, one or more computers store domain correction records. Each domain correction record comprises a misspelled domain name and candidate domain name corrections. The computers detect that an unprocessed online identifier is not contained in a plurality of known online identifiers. The unprocessed online identifier comprises a misspelled domain name. Each known online identifier of the plurality of known online identifiers comprises a domain name. The computers retrieve, based on the misspelled domain name of the unprocessed online identifier, from the plurality of domain correction records, a matching domain correction record having a same misspelled domain name as the unprocessed online identifiers. A client device displays the one or more candidate domain name corrections of the matching domain correction record.

19 Claims, 5 Drawing Sheets

(56) References Cited

U.S. PATENT DOCUMENTS

2015/0249640 A1* 9/2015 Yacoub .................. G06F 17/28
                                                                      709/203
2017/0235880 A1* 8/2017 Wright .................. G06F 19/321
                                                                      705/2

* cited by examiner

CORRECTION OF ONLINE IDENTIFIERS

FIELD OF THE DISCLOSURE

The present disclosure relates to the automatic proposal of online identifier corrections.

BACKGROUND

The uniqueness of email addresses enables them to be used as online identifiers. Interactive entry by typing is a common way to capture an email address. However, manual typing is error prone, and typographic errors are common during interactive entry of an email address. Automatic detection of an erroneous email address may be achieved either by checking for non-occurrence within a set of expected email addresses or by live validation by sending a test email.

However, automatically proposing corrections is not straightforward. Traditional solutions for email address correction have major limitations. For example, proposed corrections do not emphasize known email addresses. Likewise, traditional solutions do not recognize that an email domain name misspelling may correspond to multiple correctly-spelled email domain names. Furthermore, traditional proposal solutions involve time-expensive searches because traditional proposal mechanisms do not determine anticipated email domain typographic errors.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for automatic proposal of domain name corrections for a typographically erroneous online identifier, such as an email address or a subject name of a directory entry or a certificate. Reuse of generated proposals enables retrieval of existing proposals in constant time. Embodiments are provided that heuristically prune the generation of proposals. Embodiments record and process typo corrections that are actually applied. In an embodiment, a website proposes domain name corrections for typographically erroneous login attempts.

Example Network System

Figure 1:
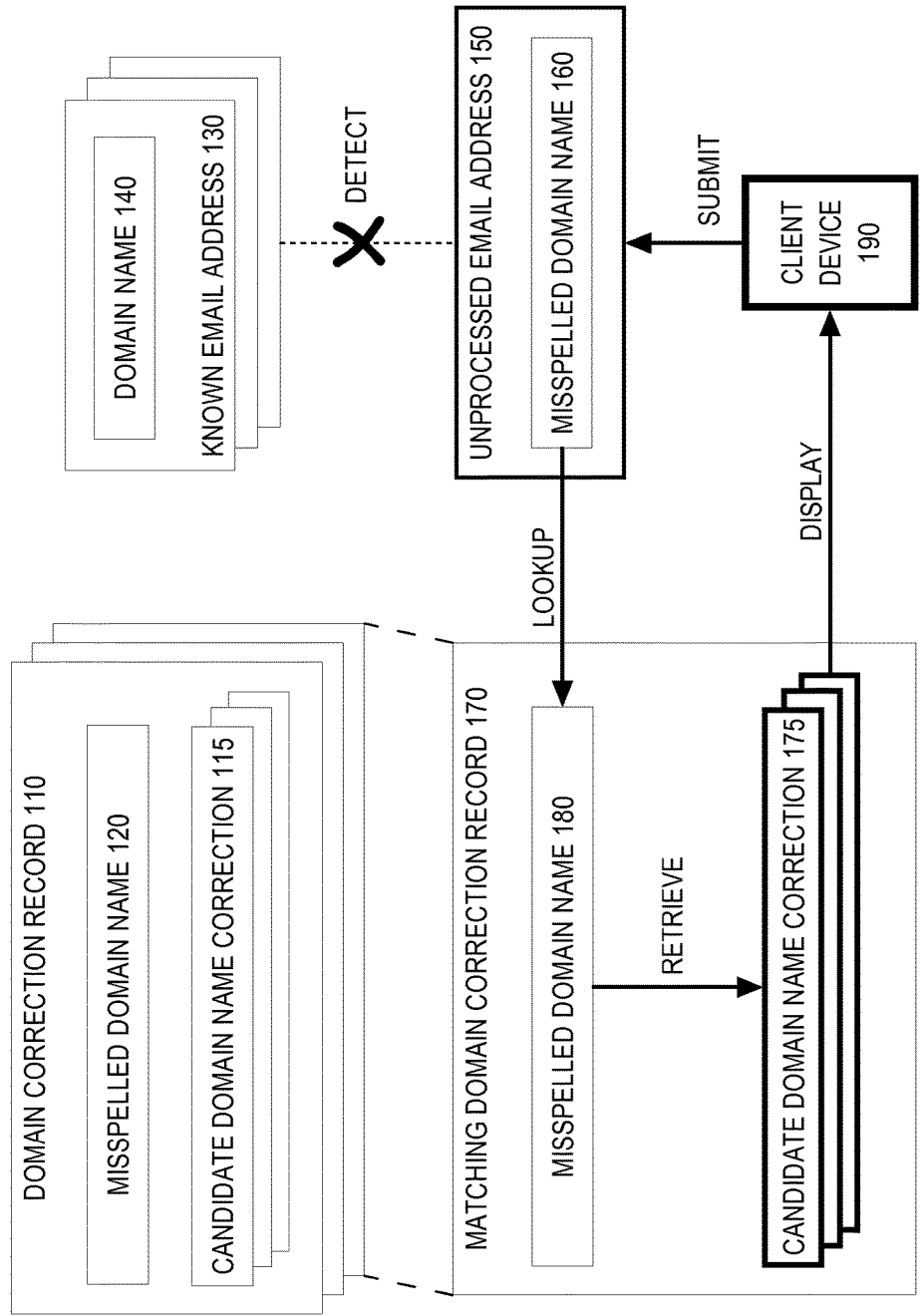
FIG. 1 is a block diagram that depicts an example network system that automatically proposes online identifier corrections, in an embodiment.

FIG. 1 is a block diagram that depicts example network system 100 for proposing online identifier corrections, in an embodiment. Implementations of network system 100 may operate as client-server, World Wide Web, Internet, and other connected topologies. Network system 100 includes domain correction records 110, known email addresses 130, unprocessed email address 150, and client device 190. Client device 190 may be a personal computer, a smartphone, or other computer having a visual display and connected to a computer network.

Although not shown, client device 190 utilizes a remote resource such as by browsing a website or consuming a web service. While using the remote resource, client device 190 may submit, to the remote resource, an email address that is associated with the remote resource and the user of client device 190.

During operation, client device 190 submits unprocessed email address 150 that has misspelled domain name 160. Email address 150 may be an online identifier, such as an email address or a subject name of a directory entry or a certificate. For example, the remote resource may be a login webpage that challenges the user for an email address and password before granting access to a user account of a website. The user may type in an email address with a domain that has a typographic error. Although not shown, the website is hosted on a server that may be part of network system 100.

Network system 100 maintains known email addresses 130, each of which is associated with a user account. Known email addresses 130 may reside in searchable database records. A user may have one or more known email addresses 130.

Network system 100 detects that unprocessed email address 150 is not among known email addresses 130 that have user accounts on the website. For example, network system 100 may issue a database query to determine that unprocessed email address 150 is unrecognized.

Network system 100 also maintains domain correction records 110, such as in a searchable database. Each domain correction record 110 has a misspelled domain name 120 and one or more corresponding candidate domain name corrections 115.

Candidate domain name corrections 115 may be automatically generated. For example network system 100 may modify a popular public email domain name, such as Gmail.com, by replacing one string character of the domain name to generate typographically erroneous variations such as Tmail.com.

Likewise, network system 100 may replace a character of Ymail.com to also get Tmail.com, as before. Hence, a typographically erroneous email domain, such as Tmail.com, may correspond to either Ymail.com or Gmail.com. As such, domain correction record 110 may have Tmail.com as misspelled domain name 120 and Ymail.com and Gmail.com as candidate domain name corrections 115.

During operation and having determined that unprocessed email address 150 is unknown, network system 100 extracts a misspelled domain name 160 from unprocessed email address 150. Network system 100 uses misspelled domain name 160 as a lookup key to search through domain correction records 110, for which network system 100 finds matching domain correction record 170.

Matching domain correction record 170 is whichever of domain correction records 110 has a misspelled domain name 120 that matches misspelled domain name 160. Matching domain correction record 170 has a misspelled domain name 180 and one or more candidate domain name corrections 175.

Network system 100 may replace misspelled domain name 160 of unprocessed email address 150 with each of candidate domain name corrections 175 to synthesize email addresses that are similar to unprocessed email address 150. For example, if unprocessed email address 150 is user@Tmail.com, then network system 100 may generate user@Ymail.com and user@Gmail.com as synthesized email address corrections.

Network system 100 may optionally validate each synthesized email address by verifying that it occurs within known email addresses 130. Network system 100 may discard a synthesized email address, and its corresponding candidate domain name correction 175, if known email addresses 130 does not contain the synthesized email address.

For example, if user@Ymail.com occurs within known email addresses 130, but user@Gmail.com does not, then network system 100 may discard user@Gmail.com. Network system 100 may mitigate validation latency by validating multiple synthesized email addresses in parallel.

Network system 100 sends those candidate domain name corrections 175 for which a synthesized email address is valid to client device 190 for display. For example, client device 190 may show a login error webpage that lists candidate domain name corrections 175 or the synthesized email addresses as choices to attempt logging in with.

Alternatively and to protect users' privacy, network system 100 may send all candidate domain name corrections 175 regardless of the validity of corresponding synthesized email addresses. Network system 100 may send candidate domain name corrections 175 as an ordered list, with valid corrections appearing in the list before invalid corrections.

The ordered list of proposed corrections may instead be sorted in descending order of frequency that each proposed correction has previously been interactively selected when offered to anyone as a correction. Alternatively, the list may be sorted in descending order of frequency that each proposed domain occurs within known email addresses 130.

Example Domain Correction Process

Figure 2:
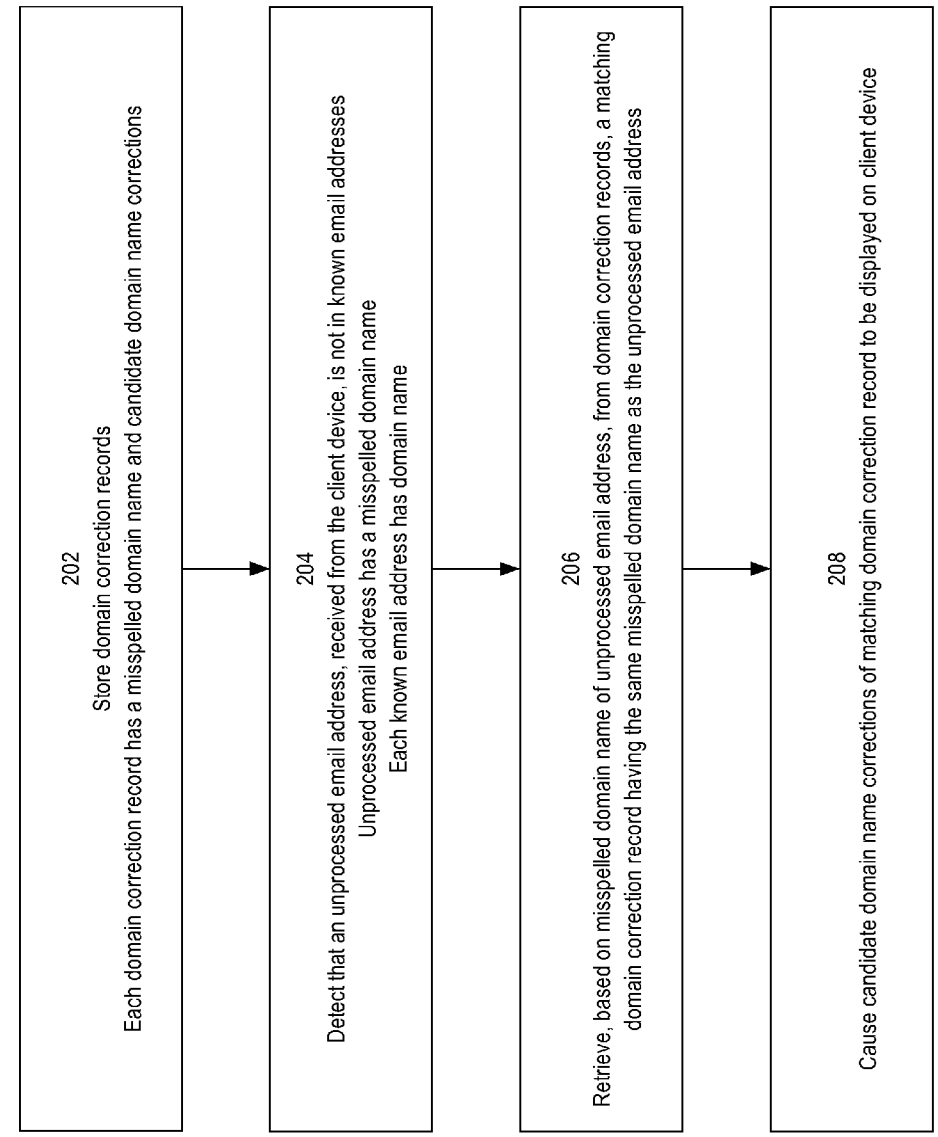
FIG. 2 is a flow diagram that depicts an example process for automatically proposing online identifier corrections, in an embodiment.

FIG. 2 is a flowchart that depicts an example online identifier correction process that may be performed by network system 100 or other embodiments.

Step 202 is preparatory and involves storing domain correction records for later retrieval. For example, network system 100 may observe successful login retries and record a typographically erroneous email domain and a corrected domain that a user manually typed in during a retry. That is, network system 100 may populate domain correction records 110 with actual typos and corrections that spontaneously occur in the wild, with occurrences perhaps exceeding a threshold frequency. Network system 100 may monitor which proposed corrections are never chosen by users and subsequently cease to offer such proposals. Network system 100 may use various programming languages and software frameworks to generate domain correction records 110.

Additionally or alternatively, network system 100 may generate misspelled domain names 120 by applying regular simple modifications of one or more characters to a domain name. Network system 100 may generate misspelled domain names 120 for domains that are the most frequently occurring within domain names 140. Highest frequency domains may be determined by data mining, such as with Hadoop and Pig.

Network system 100 may generate misspelled domain names 120 for domains that are the most recently submitted by client devices 190. Data mining may determine recent submissions such as which are the highest frequency domains as measured by logins in the last 30 days.

In step 204, an unrecognized email address is detected. For example, unprocessed email address 150 is not amongst known email addresses 130, as detected by a fruitless key lookup against a key-value repository or against a relational database. A website with a wide audience may keep known email addresses 130 in a high performance NoSQL store such as Aerospike or Cassandra that provides high availability and low latency.

In step 206, domain corrections are looked up by using a misspelled domain name as a retrieval key. For example, network system 100 may use misspelled domain name 160 (or a hash of misspelled domain name 160) as a lookup key to retrieve candidate domain name corrections 175. Network system 100 may keep domain correction records 110 in a high performance NoSQL store. A key-value store may provide look up of candidate domain name corrections 175 in constant time. Each entry in the key-value store corresponds to a misspelled domain name and includes one or more candidate domain name corrections 175. Some or all candidate domain name corrections 175 may be cached in memory.

In step 208, domain corrections are displayed to a user. For example, network system 100 sends, for display, corrections to client device 190. Network system 100 may send all candidate domain name corrections 175 or a validated subset. Network system 100 may send candidate domain name corrections 175 or complete email addresses based on candidate domain name corrections 175.

When sending corrections to client device 190, network system 100 may serialize candidate domain name corrections 175 as hypertext markup language (HTML), JavaScript object notation (JSON), extensible markup language (XML), or other encoding format. Client device 190 may display corrections in a webpage or in a screen of a dedicated application.

Typo Generation

In an embodiment, network system 100 generates misspelled domain names 120. Network system 100 may have rules that apply character modification patterns to a domain name. For example, network system 100 may insert a character, remove a character, replace a character, or transpose a character with a neighboring character. However, some misspellings are more likely to occur "in the wild" than others. Network system 100 may avoid generating unlikely misspellings.

Figure 3:
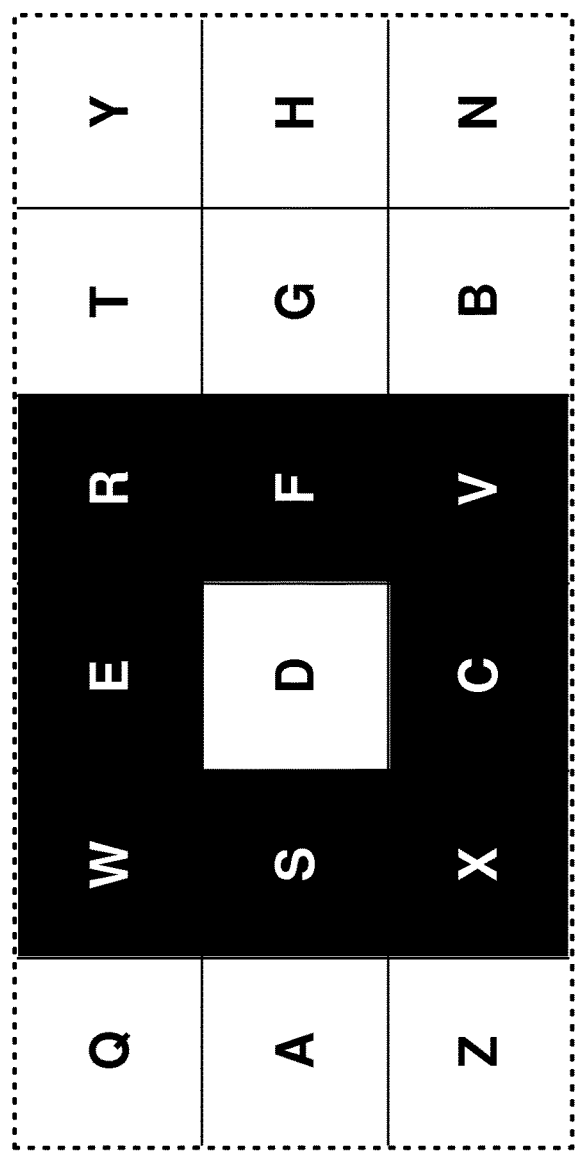
FIG. 3 is a sketch of a portion of an example QWERTY keyboard, in an embodiment.

For example, FIG. 3 depicts a portion of QWERTY keyboard 300. During typo generation, network system 100 may decide to modify the D character within linkeDin.com. The D key on keyboard 300 is surrounded by black keys. These black keys are the most likely to be accidentally struck when typing a D character. During typo generation for a D character, network system 100 may limit character substitution and character insertion to the black keys.

Around the world, many different keyboard layouts are used. An embodiment may generate typos for a variety of keyboard layouts. The Accept-Language hypertext transfer protocol (HTTP) header field may be used to detect which natural language a user employs and so which keyboard-specific typos are likely to occur for that user.

Correction Display

Figure 4:
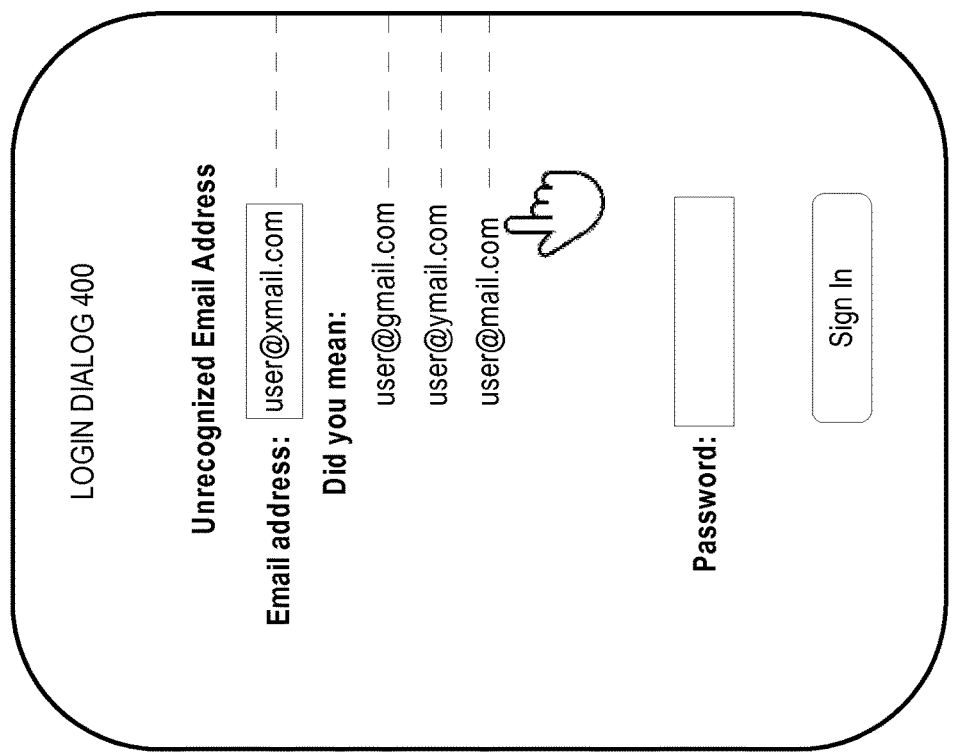
FIG. 4 is a sketch of an example login dialog, in an embodiment.

FIG. 4 depicts login dialog 400 that displays email address corrections. Login dialog 400 may be a modal, modeless, or popup dialog in a user interface. The user interface may be hosted in a webpage or a dedicated application. A client device may show login dialog 400 for interactive authentication of a user. Interactive authentication may be needed during login, account registration, or password reset.

Login dialog 400 includes text entry field 410 and address corrections 421-423. A user may ordinarily type an email address into text entry field 410, type a password in, and press the Sign In button to submit the entered information to a remote server over the global Internet.

The entered email address, user@xmail.com, has a typo, and the remote server detects that user@xmail.com is unrecognized. The remote server looks up candidate domain corrections such as gmail.com, ymail.com, and mail.com, which the remote server uses to synthesize email addresses. The remote server sends these synthesized email addresses to the client device. The client device may display the synthesized email addresses as hyperlinks or other artifacts that may be interactively selected by the user. For example, the user may click on a displayed email correction to indicate which of the proposed corrections is accurate. The client device may copy the selected correction into text entry field 410. The client device may notify the remote server as to which interactive selection occurred.

The remote server may observe and record which, if any, of address corrections 421-423 is selected by the user. The remote server may calculate on average how many login retries are needed. The remote server might not propose corrections to a control group of users. To quantify what improvement is achieved by proposing corrections, an average count of login retries of the control group may be compared to an average count of login retries of other users.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
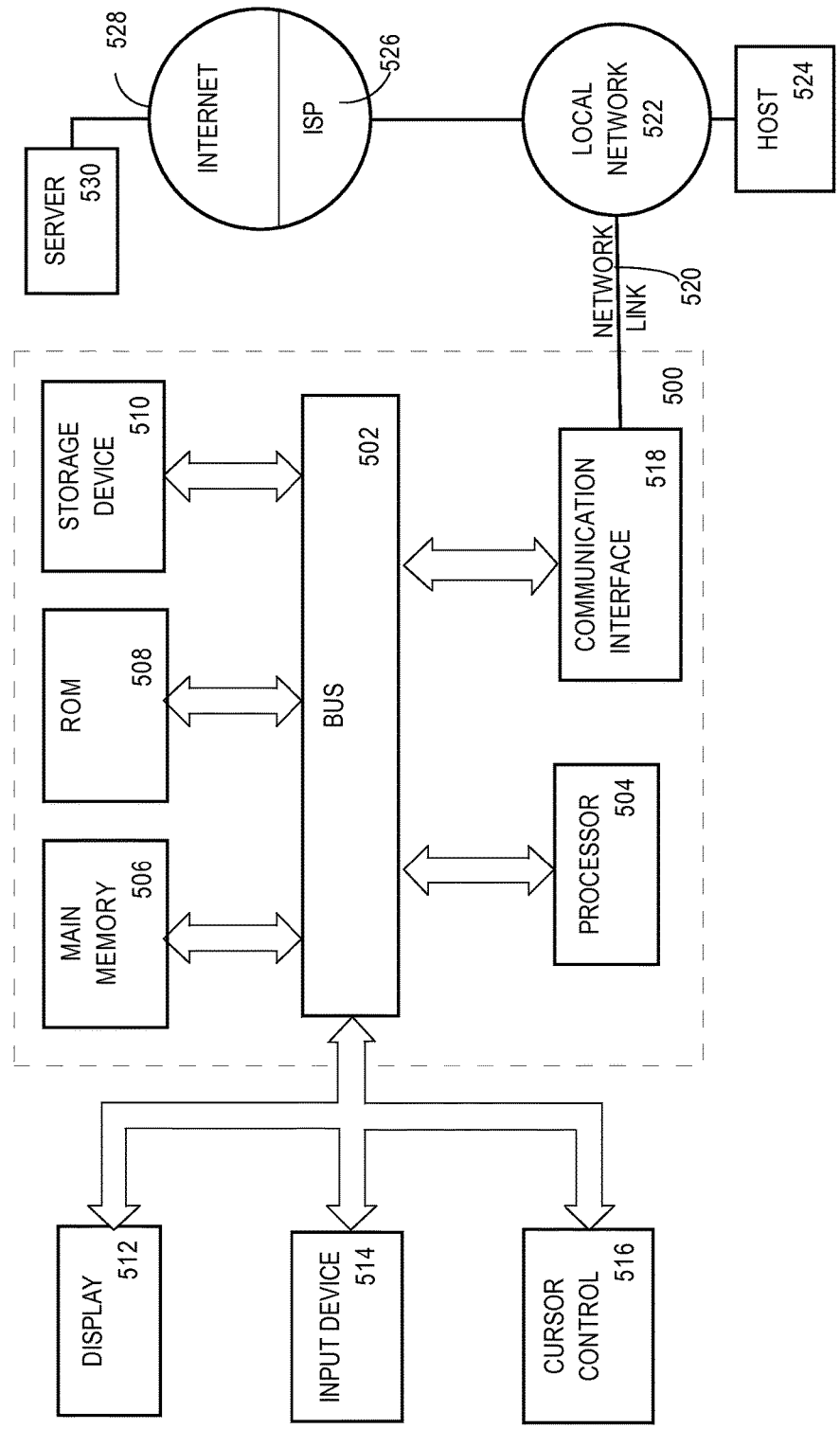
FIG. 5 is a block diagram that illustrates an example computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    durably storing a plurality of domain correction records, wherein each domain correction record of the plurality of domain correction records comprises a misspelled domain name and one or more candidate domain name corrections;
    detecting that an unprocessed email address of an attempt to log in to an online user account is not contained in a plurality of known email addresses, wherein the unprocessed email address comprises a misspelled domain name, wherein each known email address of the plurality of known email addresses comprises a domain name;
    retrieving, based on the misspelled domain name of the unprocessed email address, from the plurality of domain correction records, a matching domain correction record having a same misspelled domain name as the unprocessed email address;
    causing the one or more candidate domain name corrections of the matching domain correction record to be displayed on a client device;
    wherein each of the one or more candidate domain name corrections of the matching domain correction record occurs within the plurality of known email addresses at a frequency that exceeds a threshold;
    wherein the method is performed by one or more computers.

2. The method of claim 1 wherein each of the misspelled domain names of the plurality of domain correction records was previously observed with a frequency that exceeds a threshold.

3. The method of claim 1 wherein causing to be displayed comprises causing a login challenge to be displayed.

4. The method of claim 1 wherein causing to be displayed comprises causing the one or more candidate domain name corrections of the matching domain correction record to be displayed in descending order of frequency that each of the one or more candidate domain name corrections has previously been interactively selected when offered as a correction.

5. The method of claim 1 wherein the causing to be displayed comprises causing the one or more candidate domain name corrections of the matching domain correction record to be displayed in descending order of frequency that each of the one or more candidate domain name corrections occurs within the plurality of known email addresses.

6. The method of claim 1 wherein retrieving the matching domain correction record comprises using a key to lookup, in constant time, the matching domain correction record in a key-value store, wherein the key is based on the misspelled domain name of the unprocessed email address.

7. The method of claim 1, wherein:
    at least one of the plurality of domain correction records comprises more than one candidate domain name correction;
    the method further comprises:
        using hypertext transfer protocol (HTTP) to receive the unprocessed email address;
    wherein said retrieving the matching domain correction record comprises using the misspelled domain name of the unprocessed email address as a lookup key to retrieve, from the plurality of domain correction records, the matching domain correction record having a same misspelled domain name as the unprocessed email address.

8. The method of claim 1 further comprising:

modifying an original character of a correctly-spelled domain name to generate one or more misspelled domain names that include the misspelled domain name;

including the one or more misspelled domain names in the matching domain correction record.

9. The method of claim 8 wherein the modifying comprises removing the original character.

10. The method of claim 8 wherein the modifying comprises inserting an accidental character adjacent to the original character.

11. The method of claim 8 wherein the modifying comprises transposing the original character with an adjacent character.

12. The method of claim 8 wherein the modifying comprises replacing the original character with an accidental character.

13. The method of claim 12 wherein the original character and the accidental character are adjacent on a keyboard.

14. One or more non-transitory computer readable media comprising instructions that when executed by one or more processors cause:

durably storing a plurality of domain correction records, wherein each domain correction record of the plurality of domain correction records comprises a misspelled domain name and one or more candidate domain name corrections;

detecting that an unprocessed email address of an attempt to log in to an online user account is not contained in a plurality of known email addresses, wherein the unprocessed email address comprises a misspelled domain name, wherein each known email address of the plurality of known email addresses comprises a domain name;

retrieving, based on the misspelled domain name of the unprocessed email address, from the plurality of domain correction records, a matching domain correction record having a same misspelled domain name as the unprocessed email address;

causing the one or more candidate domain name corrections of the matching domain correction record to be displayed on a client device;

wherein each of the one or more candidate domain name corrections of the matching domain correction record occurs within the plurality of known email addresses at a frequency that exceeds a threshold.

15. The one or more non-transitory computer readable media of claim 14 wherein the misspelled domain name of the matching domain correction record comprises a misspelling achieved by modifying an original character of at least one of the candidate domain name corrections of the matching domain correction record.

16. The one or more non-transitory computer readable media of claim 14 wherein each of the misspelled domain names of the plurality of domain correction records was previously observed with a frequency that exceeds a threshold.

17. The one or more non-transitory computer readable media of claim 14 wherein causing to be displayed comprises causing a login challenge to be displayed.

18. The one or more non-transitory computer readable media of claim 14 wherein causing to be displayed comprises causing the one or more candidate domain name corrections of the matching domain correction record to be displayed in descending order of frequency that each of the one or more candidate domain name corrections has previously been interactively selected when offered as a correction.

19. The one or more non-transitory computer readable media of claim 14 wherein retrieve the matching domain correction record comprises using a key to lookup, in constant time, the matching domain correction record in a key-value store, wherein the key is based on the misspelled domain name of the unprocessed email address.

* * * * *